United States Patent [19]
Meisser et al.

[11] Patent Number: 5,598,270
[45] Date of Patent: Jan. 28, 1997

[54] SENSOR DEVICE AND POSITION DETERMINATION PROCESS AND THEIR USE FOR THE CONTROL OF AN INSERTION ROBOT

[75] Inventors: Claudio Meisser, Cham; Felix Singeisen, Kriens, both of Switzerland

[73] Assignee: ESEC S.A., Cham, Switzerland

[21] Appl. No.: 190,086

[22] PCT Filed: May 21, 1993

[86] PCT No.: PCT/CH93/00132

§ 371 Date: Jun. 6, 1994

§ 102(e) Date: Jun. 6, 1994

[87] PCT Pub. No.: WO93/24806

PCT Pub. Date: Dec. 9, 1993

[30] Foreign Application Priority Data

Jun. 3, 1992 [CH] Switzerland .................. 01787/92

[51] Int. Cl.$^6$ ........................................... G01B 11/00
[52] U.S. Cl. .................. 356/400; 356/399; 356/375; 235/470; 414/273; 901/47
[58] Field of Search .................. 356/399, 400, 356/401, 375; 414/273, 274; 901/47; 250/548, 555, 559, 561; 235/470

[56] References Cited

U.S. PATENT DOCUMENTS

| | | | |
|---|---|---|---|
| 4,764,668 | 8/1988 | Hayard | 235/470 |
| 5,303,034 | 4/1994 | Carmichael et al. | 414/274 |

FOREIGN PATENT DOCUMENTS 3241510  5/1984  Germany.

OTHER PUBLICATIONS

Namco brochure, LN110/120.

*Primary Examiner*—Frank Gonzalez
*Assistant Examiner*—Robert Kim
*Attorney, Agent, or Firm*—Cushman Darby & Cushman, L.L.P.

[57] ABSTRACT

The sensor device includes a planar code carrier on one object, and on another object, a scanning device for an angle of view for determining a viewing direction lying therein, and also a computing circuit. A photodetector detects an illumination density during the course of the scanning of the angle of view according to the direction of light incidence. On the code carrier there is arranged a rectangular code field with its center line parallel to the scanning plane. The code field includes at least two rectangular positioning fields and a rectangular interfield lying in between. The positioning fields contain positional information on the objects which can be evaluated by the scanning device. In at least one interfield, the code includes at least one boundary line obliquely intersecting the center line, the scanning of which boundary line produces a distinct variation of the illumination density in dependence on the direction of light incidence, which corresponds to a viewing direction to be established. The interfield may be subdivided by a diagonal line into two optically identical interfield regions or by a boundary line diagonally into two optically different interfield regions, and this configuration may be mirror-symmetrically duplicated.

13 Claims, 4 Drawing Sheets

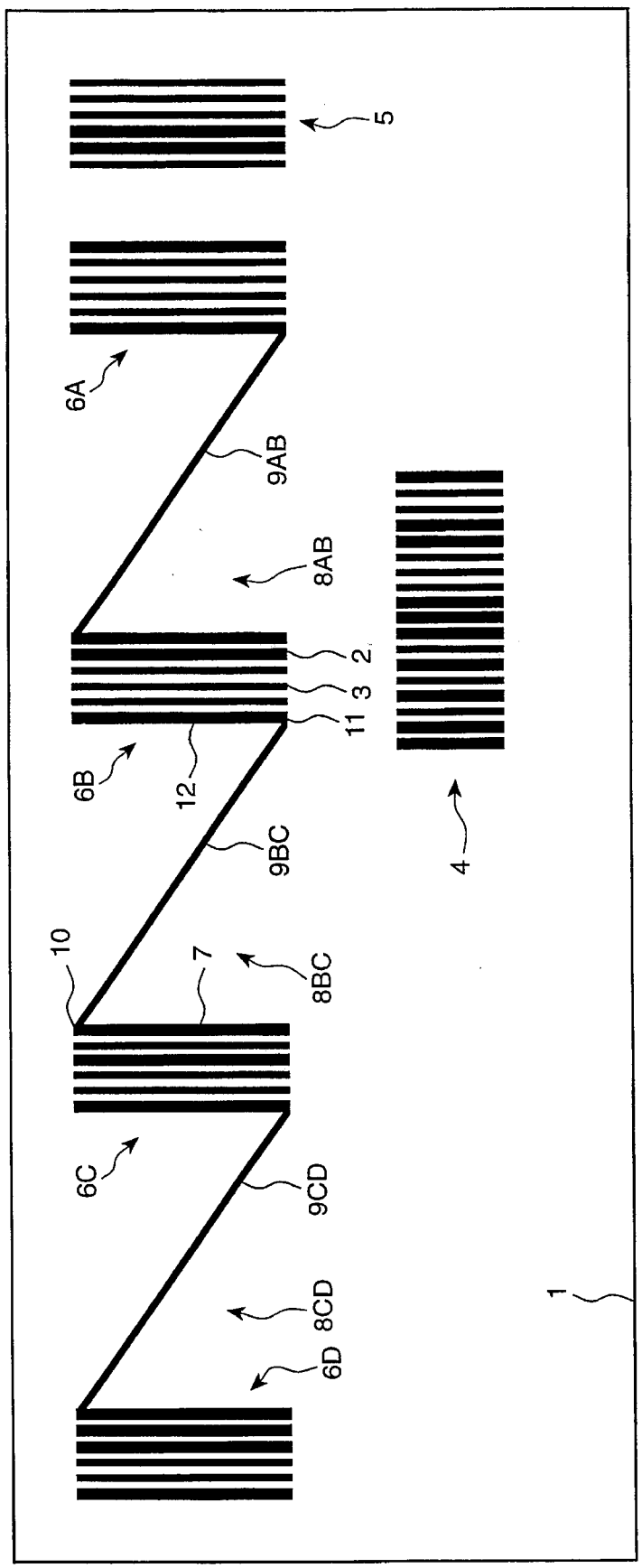

SENSOR DEVICE AND POSITION DETERMINATION PROCESS AND THEIR USE FOR THE CONTROL OF AN INSERTION ROBOT

BACKGROUND OF THE INVENTION

1. Field of the Invention

The invention relates to a sensor device for establishing the relative position of two mutually displaceable objects, a method of automatically determining a position of a displaceable robot with respect to an object with the aid of the sensor device, and a use of the sensor device and an application of the method for controlling a mounting robot for a line of machines and/or devices, in particular for the automatic processing or treatment of electronic chips.

2. Discussion of the Prior Art

FIG. 1 schematically shows in perspective a line of machines for the automatic processing and/or of devices for the automatic treatment of electronic chips according to the prior art.

FIG. 2 shows in a schematic side view selected elements of the installation shown in FIG. 1 according to the prior art.

The journal "productronic 1/2-1991", page 112 and "European Semiconductor", October 1990, disclose the line of machines schematically represented in perspective in FIG. 1 for the automatic processing and of devices for the automatic treatment of electronic chips. The machines B1–B4 are, for example, "die bonders" and "wire bonders" for establishing electrical connections on the chips, and the devices E1–E2 are, for example, continuous furnaces for the curing of plastics and devices for the intermediate storage of the chips. The chips to be processed or to be treated are contained in magazines M when they are transported, fed to the machines B1–B4 or devices E1–E2 and prepared therein for processing or treatment and also for transporting away after the processing or treatment.

The machines B1–B4 and devices E1–E2 are set up in series. Arranged behind this series, with regard to the transport of the magazines, is a rail device T, on which there runs a mounting robot R, which grips, moves, positions and releases the magazines M as required.

In FIG. 2, the machine B1, the rail device T and the mounting robot R are represented in a schematic side view. The mounting robot R travels rectilinearly and horizontally on the rail device T. A gripper G for the magazine M is supported movably on the mounting robot R by means of an advancing carriage V and a lifting carriage H. The advancing carriage V is movable on the mounting robot R horizontally and orthogonally to the rail device T towards the machine BI and away from it. The lifting carriage H is movable vertically on the advancing carriage V. Consequently, the gripper G can be moved with three Cartesian degrees of freedom or directions of movement with respect to the machine B1 in order to bring the magazine M to the intended magazine position P1 or P2 at the machine B1 and unload it there, or to grip it there and lead it away from there.

This entails the problem of automating the movements of the mounting robot R.

The machines B1–B4 are namely set up, changed and adjusted in accordance with the requirements of fabrication. The individual machines are then admittedly aligned as well as possible at right angles to the rail device T or to the running direction of the mounting robot R, but are not mechanically connected directly and in a predetermined way to the rail device T. The only common reference is the floor plane; moreover, the machines M or their magazine positions P1–P2 may be arranged at various non-standardized heights above the floor and at various non-standardized distances from the rail device T. Under these circumstances, to automate the movements of the mounting robot R it is necessary to make the mounting robot R itself learn the magazine position P1–P2 and determine the corresponding set position of the gripper G, otherwise the magazine positions P1–P2 would have to be measured after each change and entered into the control of the mounting robot R as a corresponding default value, which would be extremely complex. To detect the magazine positions concerned, sensor devices are necessary.

A sensor device which can be used for this is disclosed, for example, by the brochure "LN110/120" of the Namco company. It essentially comprises a laser as light source, a constantly rotating mirror, a photodetector and an angle-reference detector, which are all integrated in a measuring device, and also a retro-reflector and, if appropriate, code plates, which are attached on an object, and a microprocessor, one of the functions of which is that of a computing circuit. Using the constantly rotating mirror, the laser beam periodically scans a predetermined angle of view. The retro-reflector returns the laser beam to the photodetector. As long as the laser beam scanning at a constant rate meets the retro-reflector, the photodetector generates a retro-reflection pulse, the duration of which is inversely proportional to the distance of the retro-reflector from the photo-detector. The closer the retro-reflector is to the photodetector, the greater the pulse duty factor of retro-reflection duration to dark interval in a period of the scanning. On the other hand, the angle-reference detector generates an angle-reference pulse with each period of the scanning. If, during the course of scanning, the laser beam reaches the retro-reflector, a retro-reflection pulse begins. The time between the beginning of the angle-reference pulse and the beginning of the retro-reflection pulse is directly proportional to the angular position of the retro-reflector with respect to the direction of the laser beam at the beginning of the angle-reference pulse. Consequently, the angular position or the distance of the retro-reflector can be measured contactlessly, provided that the dimension of the retro-reflector in the plane of the scanning to the laser beam or orthogonally to the axis of the rotating mirror is known. If the known retro-reflector is, furthermore, arranged at a defined point of an object, or if a known object is arranged between the known retro-reflector and the photodetector in such a way that it interrupts the laser beam, the computing circuit can calculate the distance and position of the object on the same principle. In this case, there may be arranged on the object additional code plates, by which the computing circuit can identify the object.

In the immediately following text, to simplify explanations it is assumed that an object or a code plate always lies in a plane oriented essentially orthogonally to the angle bisector of the angle of view. If the object or code plate is oriented askew by a known angle to the angle bisector of the angle of view, the distances calculated by the computing circuit from the object or code plate to the optical center of the sensor device are to be corrected by the sine of this angle.

If, in a line of machines for the automatic processing and of devices for the automatic treatment of electronic chips, the mounting robot R is provided with a sensor device of the type specified above, the computing circuit supplies the information specifying the distance and position of the machines B1–B4 and devices E1–E2, but only in the plane of the scanning with the laser beam or orthogonally to the axis of the rotating mirror. To automate the movements of the mounting robot R there is still missing the information in the direction parallel to the axis of the rotating mirror or orthogonally to the plane of the scanning with the laser beam, since the information obtained with a sensor device of the type specified above is only two-dimensional, which is inadequate for automating the movements of the mounting robot R.

To overcome this inadequacy by combining two sensor devices of the type specified above is complex and, furthermore, disruptive owing to the restricted space around the mounting robot.

SUMMARY OF THE INVENTION

The object of the invention is to improve a sensor device of the type specified above in such a way that a single sensor supplies three-dimensional information which suffices in particular for automating the movements of the robot.

With the sensor device according to the invention, a single scanning device suffices for positioning the mounting robot with the aid of a code field according to the invention and, if appropriate, also for reading information in additional code fields.

The invention makes it possible on the one hand to make the computing circuit establish from the machines or devices and from the magazines their positions and dimensions simply and, if appropriate, in an automatically proceeding operation in order for these to be passed on as information to the control of the mounting robot. The mounting robot learns the positions and dimensions of the machines or devices and magazines simply and, if appropriate, in an automatically proceeding operation. Thereafter, the various positions of magazines at the various machines or devices can be moved automatically by the gripper and the various magazines can be handled according to their type.

On the other hand, it is possible with the invention to provide on the machines, devices and magazines, on the same or other code carriers, additionally and in a predetermined position in relation to the code field according to the invention further code fields, which supply information, for example on the type of a machine, of a magazine and the like. Because the mounting robot knows the positions of the additional code fields in relation to the code field according to the invention, as soon as it has learned the positions and dimensions of the machines or devices and magazines it is possible for it also to bring the further code fields into the angle of view of the scanning device in order to read their information.

Each time positions are moved to by the gripper these positions can, moreover, be checked automatically by comparison of the newly established actual position with the stored set position. The result of this check can be used for automatically correcting distance errors, which are attributable, for example, to the great length of the series of machines or devices, and displaced positions, which are caused, for example, by unintended displacing of the machines or devices or by movements and vibrations of the ground, the originally learned positions being correspondingly adjusted. The result of the check can also be used for detecting the absence of certain positions or items, if, for example, at a position for magazine reception no place is ready for an additional magazine or at a position for magazine discharging no magazine is ready.

Finally, objects which are not programmed in the control of the mounting robot can be detected as such, which allows this control to avoid collisions of the mounting robot with obstacles, such as displaced magazines, hanging-down cables, etc.

BRIEF DESCRIPTION OF THE DRAWINGS

The invention is described in more detail below with reference to the attached drawings. Further advantages of the invention are also evident from this description.

In the drawings:

FIG. 3 shows a plan view or a retro-reflector with the bar code according to the invention as a mask, for use with the known sensor device of the type specified above;

DETAILED DESCRIPTION

In FIG. 3, a retro-reflector 1, known per se and described, for example, in the already cited Namco brochure, is represented in plan view onto its essentially planar retro-reflecting surface. The retro-reflector 1 is part of a sensor device, for example of the type described in the cited Namco brochure. This sensor device is, for example, attached on a robot, such as the mounting robot R represented in FIGS. 1 and 2.

In principle, instead of a retro-reflector, a surface scattering the light in a suitable way, i.e retro-diffusion instead of retro-reflection, may also be used, and, instead of a laser beam, a different type of light beam may be used. Also, instead of a periodic scanning with laser light and a mirror rotating about an optical center, a global scanning may be used with light from a row of LEDs with use of a row of photodetectors.

Attached on the retro-reflecting surface of the retro-reflector 1 is an essentially planar mask, which has at certain points opaque thick bar-shaped lines 2 and opaque thin bar-shaped lines 3, and is transparent at its other points. The mask is, for example, a photographic emulsion coating on a glass plate, which for its part is laid over the retro-reflecting surface. The mask may, however, also be painted directly with coloring on the retro-reflecting surface of the retro-reflector 1. In principle the glass plate may also be arranged in front of the retro-reflecting surface. The opaque lines are advantageously black, in order also to be better perceivable by the eye.

Figure 1:
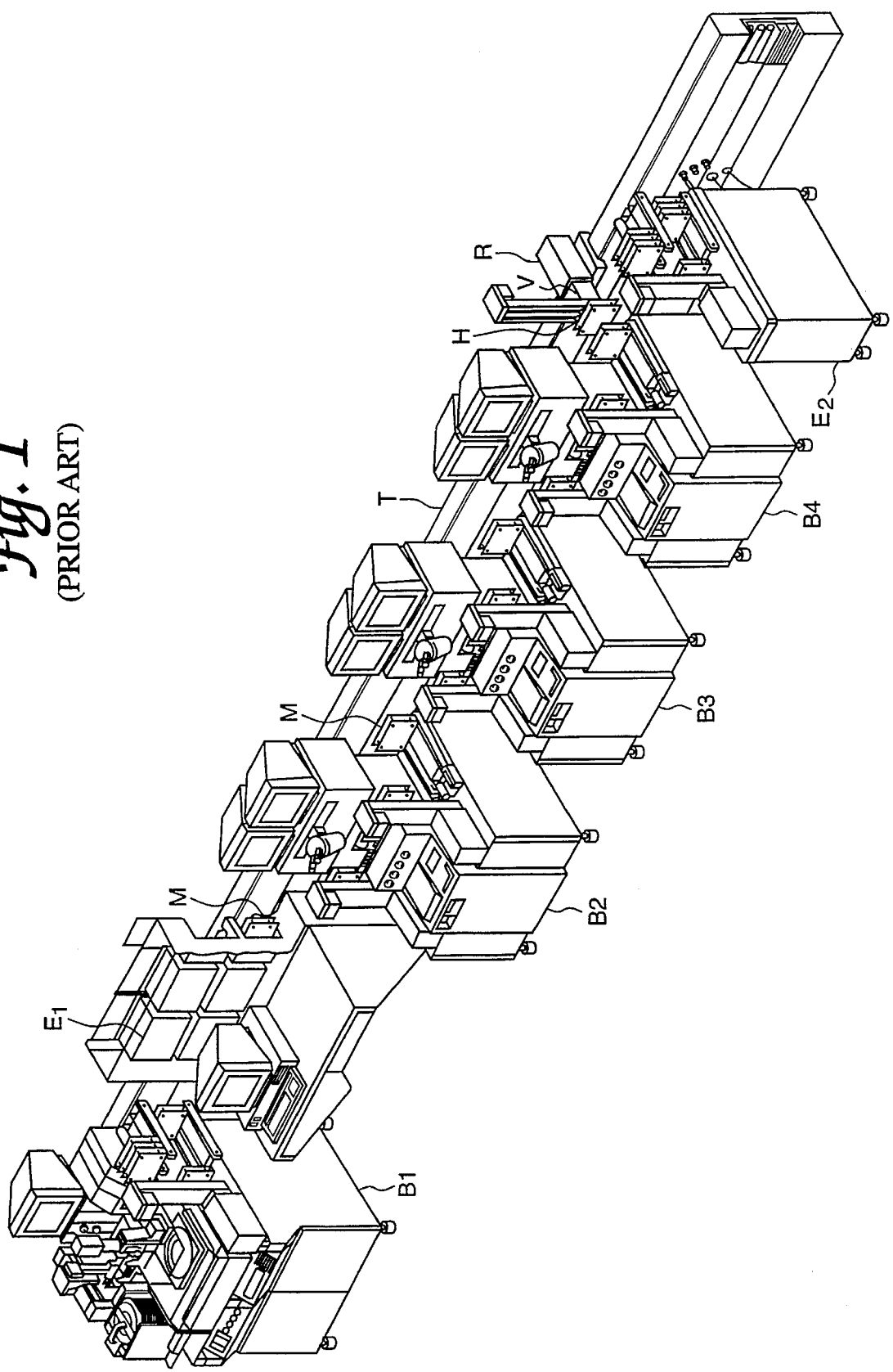
FIG. 1 schematically shows in perspective a line of machines for the automatic processing and/or of devices for the automatic treatment of electronic chips according to the prior art.
Figure 2:
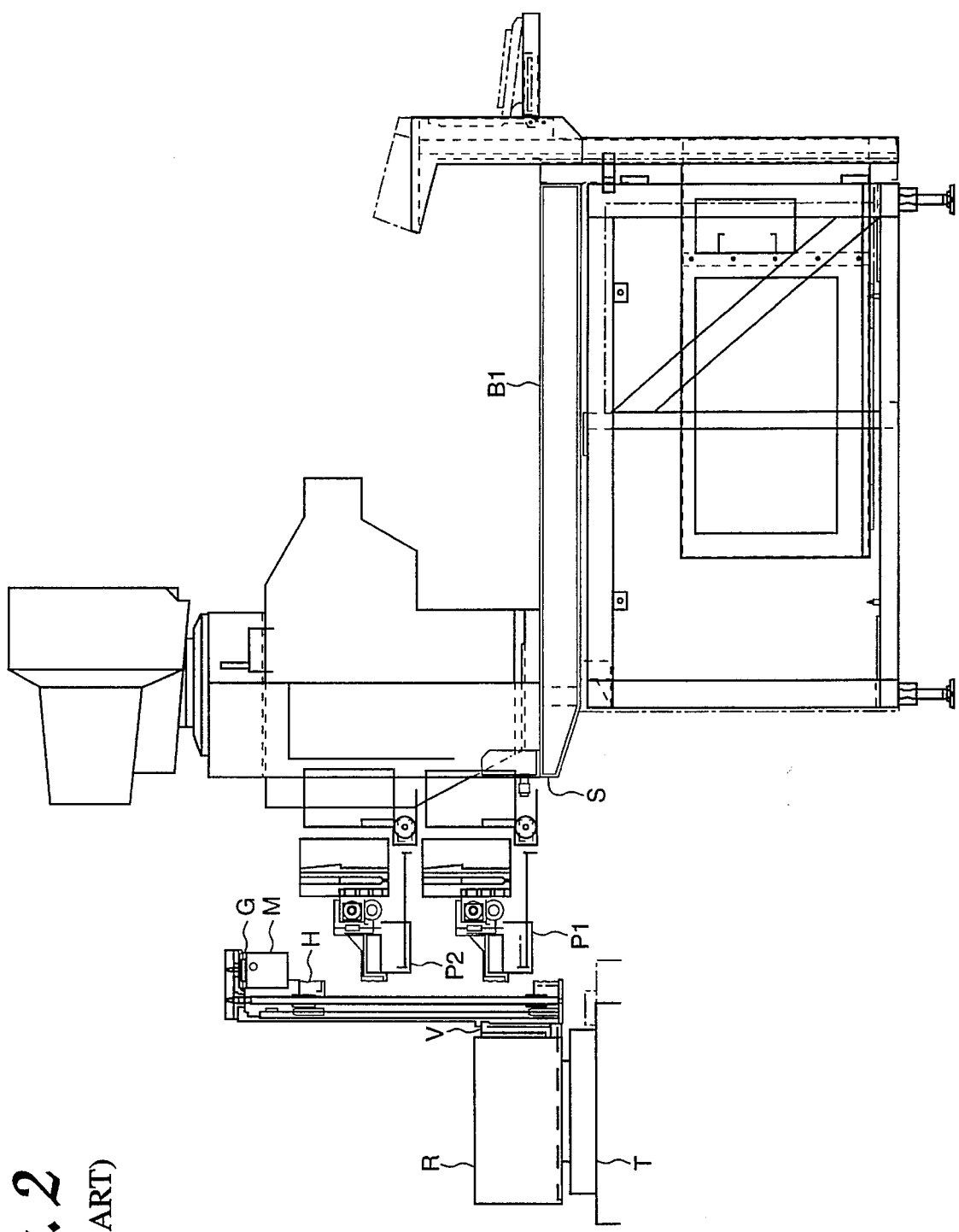
FIG. 2 shows in schematic side view, selected elements of the prior art line shown in FIG. 1.

The retro-reflector 1 with the applied mask is arranged at a predetermined point on the rear side of each machine and device of FIG. 1, for example at the point S in FIG. 2, at a predetermined height above the ground. This height is entered into the computing circuit of the robot as a corresponding default value and is consequently known by the control of the robot, so that it is possible for it to move the robot in such a way that the retro-reflector 1 comes into the angle of view of the sensor device.

Furthermore, the computing circuit of the robot is informed by a corresponding default value where in the case of a certain type of machines or devices the individual points of significance, in particular the positions at which magazines are to be brought or picked up, are located in relation to the retro-reflector 1. Thus, as soon as the computing circuit of the robot becomes aware in the way explained below of the position of the retro-reflector 1, it is possible for the control of the robot to make the gripper move automatically to the positions mentioned and to handle the various magazines in accordance with their type.

On the retro-reflector 1, the combination of lines, such as the lines 2 and 3, form various bar codes, which can be scanned by the light beam of the sensor device. For this purpose, the lines, as usual in the case of bar codes, are divided into groups of lines each with a coded meaning in the combination of lines, and each group of lines is arranged within virtual, (i.e. not provided with an actual border) rectangular line group regions, in order to form an information block.

In the exemplary embodiment of FIG. 3, four particular line group regions 6A, 6B, 6C, 6D together form a virtual (i.e. not provided with an actual border) essentially rectangular code field. The retro-reflector 1 is arranged on a machine or device of FIG. 1 in such a way that a center line of the rectangular code field lies essentially parallel to a scanning plane of the sensor device (the center line of a rectangle is generally a geometrically well-defined term, but in the present design of the invention not an actually existing line, for which reason the center line mentioned has not been drawn in FIG. 3).

In the rectangular code field, each of the line group regions 6A, 6B, 6C, 6D itself forms a virtual (i.e. not provided with an actual border) rectangular positioning field, to be precise in such a way that the rectangles concerned, virtually bordering the groups of lines, are identical. Moreover, the groups of lines are oriented in their rectangles or line group regions 6A, 6B, 6C, 6D in such a way that in each case a longer border of the rectangle or line group region, such as the border 7 or 12, is also a longer border of a line. Finally, the rectangles or line group regions 6A, 6B, 6C, 6D are arranged with respect to one another in such a way that their virtual (i.e. not represented by an actual line) short sides are aligned congruently and their long sides lie parallel to one another (incidently, the terms "long" and "short" refer to the particular representation according to FIG. 3, but they may be interchanged within the scope of the invention). Incidently, the code in a positioning field respectively comprises a group of lines of at least two rectangular lines and a rectangular interspace lying in between, the lines and interspaces differing optically from one another, for example such as light and dark, and their longitudinal direction running at right angles to the center line of the code field over the entire extent of the latter.

The respectively neighboring rectangular positioning fields or line group regions 6A and 6B, or 6B and 6C, or 6C and 6D, are arranged at the same predetermined distances from one another, so that in between in each case the same virtual (i.e. not provided with an actual border) rectangular interfields 8AB, 8BC, 8CD are defined. The code field is thus filled exactly by a sequence, alternating along the center line, positioning fields 6A, 6B, 6C and 6D and interfields 8AB, 8BC, 8CD.

The positioning fields or line group regions 6A, 6B, 6C, 6D form a series. Each group of lines is coded for the position of the line group region 6A, 6B, 6C, 6D concerning them in the series, preferably with a number from a series of consecutive numerical values. In the exemplary embodiment according to FIG. 3, the line group region 6A is coded by the number 0, the line by group region 6B by the number 1, the line group region 6C by the number 2 and the line group region 6D by the number 3. Altogether, the code arranged in a positioning field thus corresponds to a position of this positioning field in the code field, and this code comprises positional information which can be evaluated by the scanning device and specifies at which point the positioning field is located in a sequence formed by the positioning fields along the center line, the successive positions of the positioning field in the code field preferably being expressed by consecutive numerical values.

Arranged in each of the rectangular interfields 8AB, 8BC, 8CD there is in each case a diagonal line 9AB, 9BC, 9CD, which joins the mutually diagonally opposite ends of mutually opposite borders of the neighboring positioning fields or line group regions, as for example the diagonal line 9BC joins an end 10 of the border 7 of the line group region 6C with an end 11 of the border 12 of the line group region 6B. The diagonal line 9AB, 9BC, 9CD represents in the respective interfield 8AB, 8BC, 8CD a boundary line, obliquely intersecting the center line, between two surface areas of the interfield. During the scanning of this boundary line by the scanning device, the brightness contrast between the interfields and the diagonal line produces in the scanning device a variation of the illumination density, to be correct two rapidly succeeding opposed variations of the illumination density, which permits a determination of the viewing direction, which is explained in more detail below in conjunction with FIG. 4.

The arrangement described above as an example, of four positioning fields or line group regions 6A, 6B, 6C, 6D and three diagonal lines 9AB, 9BC, 9CD in the respective interfield 8AB, 8BC, 8CD, may readily be extended to a higher, but preferably even number of line group regions and the corresponding, one less, odd number of preferably mutually parallel diagonal lines.

The diagonal lines 9AB, 9BC, 9CD, as represented in FIG. 3, are preferably oriented parallel to one another, although this is not obligatory if the computing circuit has the information necessary for further processing.

Figure 4:
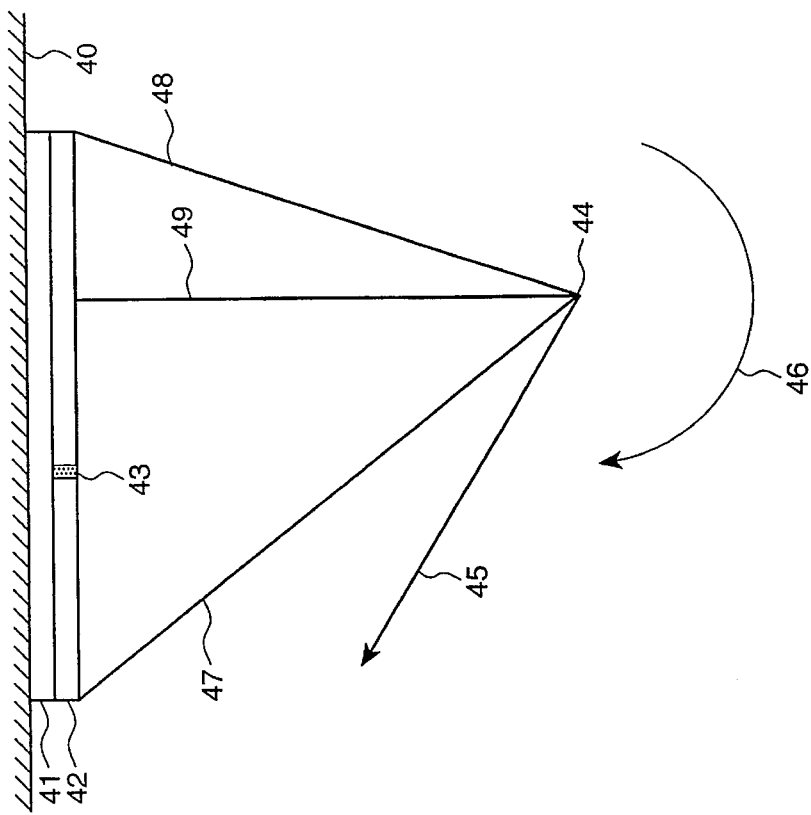
FIG. 4 shows a geometrical diagram of the angle and length relationships of bar code and light beam in the sensor device.

With regard to the description of the method according to the invention of automatically positioning the robot with respect to the retro-reflector with the mask lined thereupon, it is first of all expedient to explain the geometrical diagram represented in FIG. 4 of the angle and length relationships of bar code and light beam in the sensor device.

The basis taken for this (in particular because of the simpler geometrical relationships) is the known scanning device, for example described in the already cited Namco brochure. In principle, however, the periodic scanning known from the latter with laser light and a mirror rotating about an optical center could be replaced by a global scanning with light from a row of LEDs with use of a row of photodetectors, without departing from the principle of the explanations which follow.

In FIG. 4, a wall 40 of a machine or device on which the retro-reflector 41 is arranged is schematically represented. Arranged on the retro-reflector 41 is the mask 42, which bears the bar code, of which only a point 43 of a diagonal line, such as the diagonal lines 9AB, 9BC or 9CD of FIG. 3, is represented.

The light beam emanates from the point 44 and is sent back to the point 44 by the retro-reflector 41, unless this is prevented by the bar code of the mask 42. The point 44 thus has in the diagram of FIG. 4 the significance of an optical center of the sensor device. The retro-reflector 41 and the mask 42 are represented in the diagram of FIG. 4 with a considerable thickness, but this serves only that the retro-reflector 41 and the mask 42 can be seen and in the following is insignificant and need not be paid any attention.

On account of the deflection of the light beam by the constantly rotating mirror, the light beam moves continuously about the point 44, for example in the clockwise sense. The angular positions of the light beam are measured positively in the clockwise sense in FIG. 4, their zero value lying at an angular position predetermined in the sensor device by the angle-reference detector, which position is represented in FIG. 4 by the reference direction 45. During the course of a rotational period of the mirror, the angular position increases in the direction of the arrow 46 about the point 44 from a value at the beginning (not shown) of the angle of view at a time $t_A$, via a value at the beginning of the scanning of the mask at the line 47 at a time $t_U$ and thereafter a value at the end of the scanning of the mask at the line 48 at a time $t_V$, up to a value (not shown) at the end of the angle of view at a time $t_E$. In this case, the angular position coincides with the angle bisector of the angle of view at a time $t_W$ which corresponds to the equation $t_M=\frac{1}{2}(t_E-t_A)$. This operation is repeated with every revolution of the constantly rotating mirror, which leads to periodic scanning of an angle of view predetermined by the design of the sensor device.

As already mentioned, to simplify the explanations which follow it is assumed that the retro-reflector 41 and the mask 42 lie in a plane oriented essentially orthogonally to the angle bisector of the angle of view. Consequently, the angle bisector of the angle of view coincides with the normal 49 of the optical center 44 to the retro-reflector 41 and to the mask 42.

Because the computing circuit of the robot is known as the corresponding default value at which height above the ground the retro-reflector 41 is located, it is possible for the control to move the robot in such a way that the retro-reflector 41 comes into the angle of view of the sensor device, and the photo-detector receives a retro-reflecting light beam when the emanating light beam meets the retro-reflector 41. Once the retro-reflector 41 has in this way come into the angle of view, the method of automatically positioning a robot with the sensor device proceeds in the following way.

In a first phase, the control of the robot receives from the computing circuit the necessary information in order to set both the angular position at the normal 49 and the length of the normal 49, that is to say the distance from the optical center 44 to the retro-reflector 41, in such a way that the angle of view covers all the line group regions of the mask, that is to say in the case of the example according to FIG. 3, all four line group regions 6A, 6B, 6C, 6D. In other words, it is in this case achieved that the pulses of the photodetector, which correspond to the lines of these groups of lines, all occur in the time interval between $t_A$ and $t_E$. An earliest pulse, which begins at the time $t_{1A}$, and a latest pulse, which stops at the time $t_{1E}$, correspond to the group of lines first scanned. An earliest pulse which begins at the time $t_{2A}$, and a latest pulse, which stops at the time $t_{2E}$, correspond to the group of lines last scanned.

How the operation continues in this first phase can be explained most simply if the optical center 44 is brought in a first stage to the center perpendicular of the overall length of the line group regions 6A, 6B, 6C, 6D and in a second stage as close as possible to the line group regions 6A, 6B, 6C, 6D.

For example, the robot is for this purpose moved initially only in the horizontal until the time $t_M$ corresponds to the equation $t_M=\frac{1}{2}(t_{2E}-t_{1A})$, achieving the effect that the angle bisector of the angle of view coincides with the center perpendicular of the overall length of the line group regions, i.e. is congruent to it, and the optical center 44 lies centered, initially only in the horizontal, in front of the line group regions 6A, 6B, 6C, 6D. Thereafter, the robot is controlled, still only in the horizontal, in such a way that the time $t_M$ continues to correspond to the equation $t_M=\frac{1}{2}(t_{2E}-t_{1A})$ and, in addition, the times $t_{1A}$ and $t_{2E}$ come to correspond to the equations $t_{1A}=t_A$ and $t_{2E}=t_E$, then achieving the effect that the overall length of the line group regions fills the entire angle of view. Of course, the control receives the information necessary for this continuously from the computing circuit.

In a second phase, the control receives from the computing circuit the information necessary to reduce the distance between the optical center 44 and the retro-reflector 41, that is to say the length of the normal 49, in such a way that the angle of view from then on covers only two neighboring line group regions. Which regions these two neighboring line group regions are is selected on the basis of the coding of their groups of lines and a corresponding default value in the control. They are expediently neighboring line group regions in the center of the series, that is to say in the case of the example according to FIG. 3, the line group regions 6B and 6C, which are coded by the numbers 2 and 3, respectively, which are detected by the computing circuit. Of course, the optical center 44 in this case remains centered in the horizontal in front of the line group regions 6A, 6B, 6C, 6D.

With this approaching of the retro-reflector by the robot it is essentially intended to increase the angular values at which the various bar codes of the mask 42 are seen from the optical center 44, and thereby increase the precision of the positioning. From then on, the only diagonal line lying in the angle of view is the diagonal line 9BC, of which a point 43 is represented in FIG. 4

In a third phase, the control receives from the computing circuit the information necessary to move the robot, in this case only in the vertical, until the time at which the angular position of the light beam coincides with the point 43 of the diagonal line 9BC, or the point 43 is scanned, which coincides with the time $t_M$, achieving the effect that the optical center 44 is then also centered in the vertical in front of the line group regions 6B, 6C. During this time, the robot has not been moved in the horizontal, so that the angle of view continues to be covered only by the neighboring line group regions 6B and 6C and the optical center 44 has remained centered in the horizontal in front of the line group regions 6A, 6B, 6C, 6D.

Consequently, the optical center 44 now lies centered in the horizontal and in the vertical in front of the line group regions 6A, 6B, 6C, 6D.

The computing circuit is thereupon in the position to calculate the coordinates of the optical center 44 with respect to the center point of the line group regions 6A, 6B, 6C, 6D. In Cartesian coordinates, the coordinate in the direction perpendicular to the retro-reflector 41 and to the mask 42 is given by the length of the normal 49, while in the directions parallel to the retro-reflector 41 and to the mask 42 the coordinate is equal to zero, because the optical center 44 is indeed centered in front of the line group regions 6A, 6B, 6C, 6D (this is the very simplification mentioned above). These coordinates, or the individual coordinate actually to be determined are prepared by the computing circuit for use by the control as a position reference of the robot with respect to the retro-reflector and are passed to the control. From then on, the control of the robot is capable of making the gripper move automatically to the individual points of significance at the machine or device concerned, in particular the positions at which magazines are to be brought or picked up, and handle the various magazines in accordance with their type.

In general, there are two mutually equivalent possibilities of relating the local reference systems of the code carrier and of the scanning device to each other, namely by creating a direct relationship or an indirect relationship by means of a common system of coordinates or more than one system of coordinates related to one another. On the one hand, in the scanning plane the angular position of the viewing direction about the optical center may be related to a reference direction lying in a predetermined angular position to the plane of the code carrier. On the other hand, the plane of the code carrier may be arranged in a position predetermined in a system of coordinates, while in the scanning plane the angular position of the viewing direction about the optical center is related to a reference direction of the angular position predetermined in the system of coordinates.

Preferably, however, all the calculations are simplified by the reference direction lying orthogonally to the plane of the code carrier and the displacements taking place in three mutually orthogonal directions, of which one lies parallel to the reference direction and the two others lie parallel to the plane of the code carrier.

For executing the method according to the invention, it would suffice for the line group regions to lie in the angle of view, while, in principle, it is not necessary for the angle bisector of the angle of view to coincide with the center perpendicular of the line group regions. If the angle bisector of the angle of view does not coincide with the center perpendicular of the line group regions, the optical center of the sensor device is not centered in front of the line group regions, whereupon the trigonometric calculation of the position of the optical center in relation to the retro-reflector becomes more complicated and the computing circuit and the control become correspondingly more complex, but the calculation and the corresponding design of the computing circuit and of the control remain within the scope of general technical knowledge and therefore need not be described in detail. For example, the computing circuit may be designed as a microprocessor and be correspondingly programmed.

For executing the method according to the invention, it would also suffice for the overall length of the line group regions to fill the entire angle of view, while it is not necessary for only two selected line group regions to fill the entire angle of view. If no approaching of the sensor device to the retro-reflector takes place, the only effect is that the achieved precision of the position determination in the horizontal and in the vertical as well is less than in the case of the method described with such an approach.

Finally, for executing the method according to the invention it is not essential for the optical center 44 also to be centered in the vertical in front of the line group regions 6B, 6C. In general, the angular position of the light beam at a certain time $t_H$ coincides with the diagonal line 9BC, i.e. a point 43 of the diagonal line 9C is scanned at the time $t_H$. This time $t_H$ varies linearly with the position of the optical center 44 ill the vertical in front of the line group regions 6B, 6C. It is assumed that the optical center 44 is centered in the horizontal in front of the line group regions 6B, 6C, as described in the text above, that is to say that the equation $t_M = \frac{1}{2}(t_{2E} - t_{1A})$ is satisfied. Under these circumstances, the time $t_H$ coincides with the time $t_M$ when the optical center 44 is also centered in the vertical in front of the line group regions 6B, 6C. However, the time $t_H$ coincides with the time $t_{1E}$ when the optical center 44 lies in the vertical in front of the border last scanned of the group of lines first scanned, and coincides with the time $t_{2A}$ when the optical center 44 lies in the horizontal in front of the border first scanned of the group of lines last scanned. Consequently, this time $t_H$ varies linearly between the extreme values $t_{1E}$ and $t_{2A}$ in dependence on the position of the optical center 44, in the vertical in front of the line group regions 6B, 6C. A simple proportional calculation thus allows the computing circuit to calculate the position of the optical center 44 in the vertical in front of the line group regions 6B, 6C in dependence on the times $t_H$, $t_{1E}$ and $t_{2A}$ and to prepare it for use by the control of the robot.

The preparation described of the information on the position of the optical center of the sensor device in the horizontal and in the vertical in front of the line group regions, that is to say in front of the retro-reflector and the mask, and the passing on of this information to the computing circuit makes it possible for the control of the robot to position itself, if appropriate, in front of other line group regions, such as for example in front of the line group regions 4 or 5 in FIG. 3, in order to read further information in these additional code fields. For example, the type of the machine or device on which the retro-reflector 1 is attached is coded on the retro-reflector 1 in the line group region 4, while a further line group region 5 can be used for additional coded information. Moreover, one or more further retro-reflectors may be provided with additional code fields and be arranged ill a predetermined position in relation to the retro-reflector 1. Since the computing circuit is aware of the predetermined position of these additional code fields in relation to the code field of the retro-reflector 1, it is possible for the control of the robot to go to these additional code fields without a preceding search, in order to read their information.

Consequently, a single scanning device suffices both for the initially necessary determination of the position of the mounting robot ill relation to the machines or devices and their magazine positions and thereafter for the reading of further code fields, which supply information, for example, on the type of a machine, of a magazine and the like. Because the mounting robot knows the positions of the additional code fields as soon as it has learned the positions and dimensions on the machines or devices and on the magazines, it is possible for it also to move to the further code fields and bring itself into the angle of view of the scanning device, in order to read their information.

By the preparation described of the information on the position of the optical center of the sensor device in the horizontal and in the vertical ill front of the line group regions, that is to say in front of the retro-reflector and the mask, and by the passing on of this information to the control of a robot, it is possible, for example, to control a mounting robot for a line of machines and/or devices, in particular for the automatic processing, and/or of devices for the automatic treatment of electronic chips in such a way that the correct magazines are brought to the correct position of the correct machines or devices and are picked up from these positions.

In the case of any one of these positioning operations, the computing circuit of the sensor device and/or the control may also check whether the current set position coincides with the set position determined earlier. If this is not the case, the machine and/or device concerned has, for example, been displaced or otherwise changed, which, for example, sets off an alarm.

In FIGS. 5a, 5b, 6a and 6b, in each case various variants of the design of the code in an interfield are represented as a geometrical diagram. The frame now represented diagrammatically corresponds in each case to the interfield which has already been described in the above text in conjunction with FIG. 3, but there only with a virtual border, i.e. not represented by an actual line.

Figure 5B:
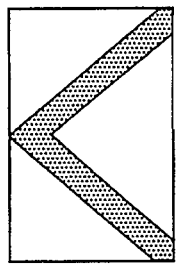
FIGS. 5a and 5b each show a geometrical diagram of the angle and length relationships of boundary lines and surface areas in an intermediate field with a diagonal line and two optically identical intermediate field regions.
Figure 5A:
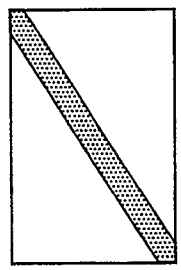

In FIG. 5a, for a better overview, the design which has already been described in the text above in conjunction with FIG. 3 is represented once again. A diagonal line crosses through the interfield, essentially diagonally and by section approximately into two interfield regions of an optically identical nature. The diagonal line is dark and the interfield regions are light (or vice versa), i.e. the diagonal line is optically different from the interfield regions. Each of the two interfield regions produces with the diagonal line a boundary line, which crosses through the interfield approximately diagonally; there are consequently two mutually parallel boundary lines. The scanning device responds to the optical contrast at the two boundary lines by this contrast producing in it a variation of the illumination density, which leads to the determination of a viewing direction.

In FIG. 5b, a design which is derived from the design according to FIG. 5a essentially by mirror-symmetrical duplication is represented, the interfield being essentially bisected along the center line into two interfield parts, and the diagonal lines of one interfield part and of the other interfield part lying at an angle to each other so as to be chevron-shaped.

Figure 6B:
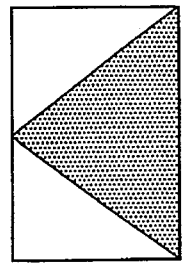
FIGS. 6a and 6b each show a geometrical diagram of the angle and length relationships of boundary lines and surface areas in an intermediate field with two optically different intermediate field regions.
Figure 6A:
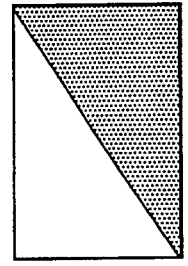

In FIG. 6a, a design in which the interfield is essentially bisected essentially diagonally into two optically different interfield regions is represented. The one interfield region is dark and the other light, i.e. a boundary line crosses through the interfield essentially diagonally. The scanning device responds to the optical contrast at this boundary line by this contrast producing in it a variation of the illumination density, which leads to the determination of a viewing direction.

In FIG. 6b, a design which is derived from the design according to FIG. 6a essentially by mirror-symmetrical duplication is represented, the interfield being essentially bisected along the center line into two interfield parts and the boundary lines of one interfield part and of the other interfield part lying at an angle to each other as to be chevron-shaped.

It is quite possible for there to be other designs of the code in an interfield, in which the code in at least one interfield comprises at least one a boundary line obliquely intersecting the center line between two surface areas of the interfield, and the surface areas are designed for the purpose of producing during the scanning of their common boundary line by the scanning device in the latter a variation of the illumination density, which leads to the determination of a viewing direction. In particular, it is to be understood that the drawings represented in FIGS. 5a, 5b, 6a and 6b can be mirror-inverted about the two virtual center lines of their rectangles, i.e. in FIGS. 5a, 5b, 6a and 6b the terms "upper" and "lower" are interchangeable, and likewise the terms "light" and "dark" are interchangeable, without departing from the principle of the invention.

In all the designs of the code described in the above text, the code field preferably comprises an even number of positioning fields of the same size as one another and a corresponding odd number, one less, of interfields of different sizes to one another, and the interfields are either identical or mirror-identical to one another. In the preferred design according to FIG. 3 the code field comprises precisely four positioning fields and three interfields.

What is claimed is:

1. A system for sensing the relative position of two mutually displaceable objects, comprising:

an optical code provided in a code field of a substantially planar code carrier arranged on one of said objects for displacement therewith;

an optical scanner having a field of view which extends throughout a viewing angle relative to an optical center, the optical scanner being equipped to detect illumination density and direction from said optical center for reading said optical code; said scanner being arranged on the other of said objects for displacement therewith;

an illuminator for causing light to become incident on said code field;

means for displacing at least one of said objects relative to the other of said objects, and thereby causing light which has become incident on said code field to become within said viewing angle and detectable by said optical scanner;

said field being substantially rectangular, having a longitudinal centerline and including a plurality of fields arranged in a series extending along said centerline and including at least one substantially positioning field arranged between two substantially rectangular interfields;

said positioning field containing coded information about the position of said positioning field with respect to a reference point on said one of said objects and about the identity of one of said objects;

each said interfield including at least one boundary line between two areas which, when illuminated by said illuminator, can cause differing illumination density to be detected by said optical scanner, said boundary line crossing said centerline at an oblique angle thereto; and control means operatively interconnecting said optical scanner and said displacing means, for mutually positioning said two objects so as to provide a determined relative position, based on differing illuminator density detected by said optical scanner as a result of illumination of said boundary lines of said interfields by said illuminator.

2. The system of claim 1, wherein:

in each of said interfields, each respective said boundary line is a diagonal line.

3. The system of claim 1, wherein:

in each of said interfields, there are two said boundary lines which are oblique to said centerline and oppositely oblique relative to one another.

4. The system of claim 1, wherein:

each of said interfields is flanked by respective two said positioning fields, for a total of at least three interfields and at least four said positioning fields;

the coded information contained by said positioning fields being related in a series which extends along said centerline.

5. The system of claim 1, wherein:

said one object is a processing line for electronic computer chips, and said other object is a robot for acting on computer chips on said processing line.

6. The system of claim 5, wherein:

said displacing means is operable for moving said robot in these mutually orthogonal directions relative to said processing line.

7. An information-providing target for use in locating a mobile robot relative to a station on an automated processing line, comprising:

a substrate mountable at a site corresponding to a station on the automated processing line;

an information block comprising a series of groups of line patterns extending in a given direction corresponding to a scanning direction of a sensor;

said information block being affixed to said substrate;

said series of groups of line patterns being constituted by a plurality of positioning fields alternating with a plurality of interfields;

each positioning field comprising a plurality of parallel straight lines extending normal to said direction, within a notional rectangle, as to have opposite line ends;

each interfield being located between a respective two of said positioning fields and including at least one line extending obliquely relative to said direction.

8. The target of claim 7, wherein:

said substrate is retro-reflective, and each said line is opaque.

9. The target of claim 7, wherein:

each said interfield comprises a single line extending diagonally between opposite ends of respective most closely neighboring ones of said lines of respective adjacent ones of said positioning fields; said single line being disposed between two triangular non-lined areas which, together with said single line, fill a respective notional rectangle.

10. The target of claim 7, wherein:

there are three said interfields.

11. The target of claim 7, wherein:

each said interfield comprises a pair of triangular forms sharing a hypotenuse which extends diagonally between opposite ends of respective most closely neighboring ones of said lines of two respective adjacent ones of said positioning fields; one of said triangular forms having a substantially different degree of light reflectivity or transmissivity than the other.

12. The target of claim 7, wherein:

each said interfield comprises a chevron-shaped line composed of two line segments which meet at an apex located intermediate, relative to said direction, respective most closely neighboring ones of said lines of respective adjacent ones of said positioning fields; said single line being disposed in complementary alternation with these triangular non-lined areas, which, together with said chevron-shaped line, fill a respective notional rectangle.

13. The target of claim 7, wherein:

each said interfield comprises a series of three triangular areas, including two flanking triangular areas and one central triangular area, mutually bounded by a chevron-shaped interface and, together, filling a respective notional rectangle; said central triangular area having a substantially different degree of light reflectivity or transmissivity than do said to flanking triangular areas.

* * * * *